United States Patent [19]

Carrington

[11] 4,146,260
[45] Mar. 27, 1979

[54] LEASH-HOLDER SCOOP FOR ANIMAL WASTE

[76] Inventor: Walter T. Carrington, 9165 S. Harvard, Chicago, Ill. 60620

[21] Appl. No.: 858,253

[22] Filed: Dec. 7, 1977

[51] Int. Cl.² ........................................... A01K 29/00
[52] U.S. Cl. ................................................. 294/19 R
[58] Field of Search .................. 294/19 R, 19 A, 1 R, 294/55; 119/1; 15/257.1, 257.4, 257.6, 257.7, 257.8

[56] References Cited

U.S. PATENT DOCUMENTS

| 4,003,595 | 1/1977 | Fano et al. | 294/19 R |
| 4,010,970 | 3/1977 | Campbell | 294/19 R |
| 4,012,067 | 3/1977 | Travis | 294/19 R |

Primary Examiner—James B. Marbert
Attorney, Agent, or Firm—Howard I. Podell

[57] ABSTRACT

A leash-holder scoop for animal waste for collecting droppings while walking the pet on a leash by holding a plastic throw-away bag under the pet. The bag is removably secured to a bent tube attached to a handle having a leash latch pivoted thereon. The rim of the holder is narrow so that it can be used for picking up droppings. The bag holder is a round sleeve with a flat segment holding elastic fitting around the top of the bag and holding it against the sleeve.

3 Claims, 3 Drawing Figures

LEASH-HOLDER SCOOP FOR ANIMAL WASTE

FIELD OF THE INVENTION

This invention relates generally to a scoop for animal waste for preventing pollution thereby.

DESCRIPTION OF THE PRIOR ART

The prior art, as exemplified by U.S. Pat. No. 3,703,158; 3,771,493; 3,581,975; 3,684,155 and 3,786,780 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or bulky and inconvenient to use, or require unusual skill and/or dexterity to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction so as to encourage widespread use thereof.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in a leash-holder scoop for animal waste for collecting droppings while walking the pet on a leash by holding a plastic throw-away bag under the pet. The bag is removably secured to a bent tube attached to a handle having a leash latch pivoted thereon. The rim of the holder is narrow so that it can be used for picking up droppings. The bag holder is a round sleeve with a flat segment holding elastic fitting around the top of the bag and holding it against the sleeve.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
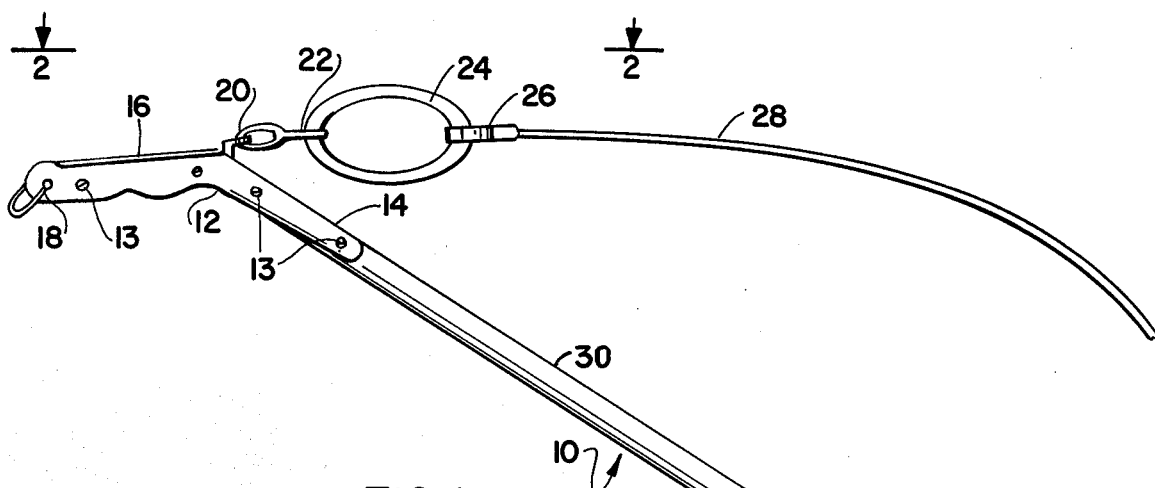
FIG. 1 is a view in perspective of the scoop-leash holder according to a preferred embodiment of the invention.
Figure 2:
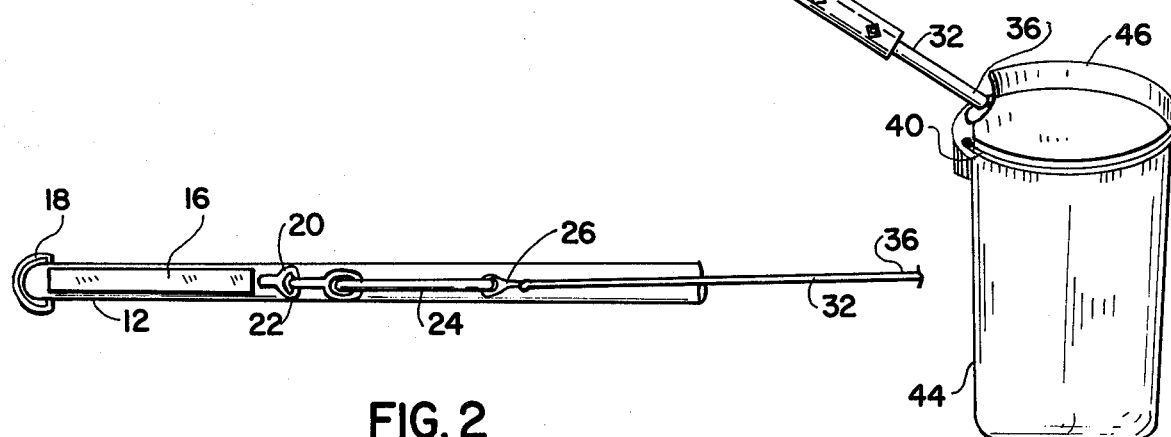
FIG. 2 is a top plan view thereof taken along line 2—2 of FIG. 1.

With reference to the drawing, there is shown and illustrated a portable scoop for animal waste constructed in accordance with the principles of the invention and designated generally by reference character 10. The illustrated tangible embodiment of the invention includes a two piece metal or plastic, open bottomed hand grip or handle 12 held together by bolts 13 which is bent at an obtuse angle from the horizontal so as to have its outward extremity 14 point downwardly, as shown in FIG. 1. Preferably, the upper surface of the grip is flat to allow securing thereon a pet name plate 16. The inward end of grip 12 has a ring 18 for hanging the article on a hook for storage when not in use.

At the end of the straight upper surface of grip 12 is secured or formed a retaining ring 20 to which are secured links 22 and 24. To the end of large ring 24 is secured the inward end 26 of leash 28.

Figure 3:
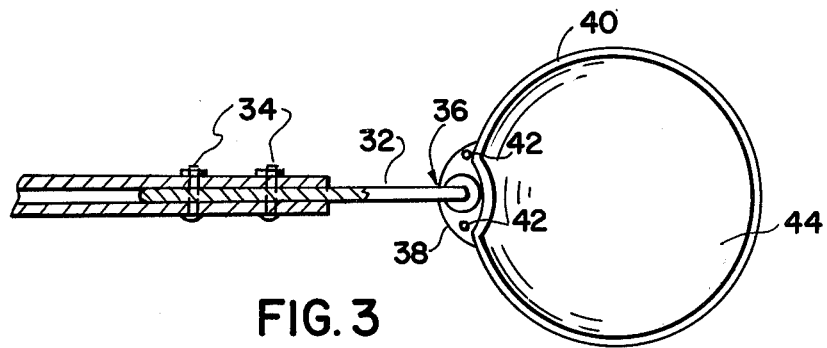
FIG. 3 is a detailed top planar view of the bag holding means.

The bent end 14 of handle 12 has a stainless steel tube 30 secured thereto by bolts and nuts 13. Conveniently, tube 30 will be about 30 inches long. A thinner rod 32 is secured to the outward end of rod 30 by bolts and nuts 34 at one end thereof with its own outward end 36 being secured by a weld, or screws and nuts or otherwise to the ledge 38 (FIG. 3) formed at the inward end of circular partial metal sleeve 38. An elastic band 40 has its ends secured in openings 42, 44. As shown in FIG. 3, elastic band 40 holds the upper part of disposable plastic bag 44 against partial sleeve 38.

If the user of the device misses the droppings, these can be picked up by using the rim 46 of steel band or sleeve 38 which is only about ⅛inch thick.

Preferably bag 44 will be made of opaque polyethylene and will be five inches wide and ten inches deep.

The present device also called a "Canine Caddy" allows the pet owner to collect pet droppings before they hit the ground and allows the owner to remove the bag by simply pulling it down free of elastic 40 so as to avoid direct contact with pet feces. The pet owner can then either dispose of the bag in municipal waste baskets, or, in those cities where local ordinances forbid it, carry the bag (with dignity) back home for disposal.

The present device also is useful as a leash walker and is a protection against large dogs which are not leashed.

In view of the polluted state of parks and city streets, it would be of tremendous hygienic advantage if devices of this type were made mandatory for pet owners who walk their pets.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. A leash-holder and scoop for animal waste, comprising in combination, a handle having leash-holding means; an elongated rod having its inward end secured to the outward end of said handle; a retaining member having one end mounted on the outward end of said rod; said member having a vertical rim adapted to serve as a scoop; elastic means attached to said member and fitting therearound for removably securing the upper end of a disposable bag thereagainst.

2. The invention as recited in claim 1, wherein said member includes a ledge part secured to said rod; said ledge part having openings therein for securing the ends of said elastic means.

3. The combination as recited in claim 1 in which a leash is fixed to the leash holding means.

* * * * *